*(12)* United States Patent
Isoda

(10) Patent No.: US 9,277,085 B2
(45) Date of Patent: Mar. 1, 2016

(54) INFORMATION PROCESSING APPARATUS ENABLING TRANSMISSION OF FILE CONTAINING LINK INFORMATION, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Takashi Isoda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/457,456

(22) Filed: Aug. 12, 2014

(65) Prior Publication Data

US 2015/0055188 A1 Feb. 26, 2015

(30) Foreign Application Priority Data

Aug. 21, 2013 (JP) ................................. 2013-171246

(51) Int. Cl.
*H04N 1/21* (2006.01)
*H04N 1/44* (2006.01)
(52) U.S. Cl.
CPC ........... *H04N 1/2166* (2013.01); *H04N 1/4486* (2013.01)
(58) Field of Classification Search
CPC .................................................. H04N 1/2166

USPC ........... 358/1.15, 403; 709/206, 217; 707/610
See application file for complete search history.

(56) References Cited

U.S. PATENT DOCUMENTS

| 8,185,595 | B2 | 5/2012 | Okabe | |
|---|---|---|---|---|
| 2010/0036872 | A1* | 2/2010 | Hiraiwa et al. | 707/103 R |
| 2010/0149570 | A1* | 6/2010 | Kamiya et al. | 358/1.13 |
| 2010/0198782 | A1* | 8/2010 | Okabe | 707/610 |

FOREIGN PATENT DOCUMENTS

JP 2010-176634 A 8/2010

\* cited by examiner

*Primary Examiner* — Jacky X Zheng
(74) *Attorney, Agent, or Firm* — Rossi, Kimms & McDowell LLP

(57) ABSTRACT

An information processing apparatus that is capable of accessing to a destination file even when a file including effective entity data and link information to the destination file is transmitted to an external apparatus. An obtaining unit obtains a destination file when a designated file to be transmitted contains link information to the destination file that is different from the designated file. An edition unit edits the link information contained in the designated file so as to become valid link information to the destination file even when the destination file obtained by the obtaining unit and the designated file will be transmitted to an external apparatus. A transmission unit transmits the designated file containing the link information edited by the edition unit and the destination file to the external apparatus.

15 Claims, 18 Drawing Sheets

FIG. 2A

| |
|---|
| FTP://abc.def.jp/file_trunc/filename3.qwe |
| smb://abc.def.jp/file_trunc/filename3.qwe |
| Http://www.abc.def.jp/file_trunc/filename3.qwe |
| ..¥..¥path1¥path2¥filename1.enc |
| D:¥pathA¥pathB¥filename2.enc |
| ¥¥PC_name.def.co.jp¥file_serve/filename5.asd |

FIG. 2B

| |
|---|
| http://OUTSIDE INTRANET DOMAIN ADDRESS/ |
| https://OUTSIDE INTRANET DOMAIN ADDRESS/ |
| http://OUTSIDE INTRANET DOMAIN ADDRESS/ |
| https://OUTSIDE INTRANET DOMAIN ADDRESS/ |
| INSIDE COMPLETE DOMAIN MODIFIER |

FIG. 2C

| | |
|---|---|
| PREDETERMINED LINK INFORMATION | ..¥ |
| EXAMPLE OF GENERATED LINK INFORMATION | ..¥3456.pptx |

FIG. 3A

FILE DESIGNATION SCREEN

FOLDER DESIGNATION

ABC
DEF
GHQ
LMN
XYZ
QRS 12345.pdf
2345.pdf
3456.pptx
4567.docx (NEXT)

FIG. 3B

FILE OPERATION DESIGNATION SCREEN

- ☑ TRANSMISSION
- ☐ COPY
- ☐ MOVEMENT
- ☐ EDITION
- ☐ DELETION
- ☐ RENAME (NEXT)

FIG. 3C

PARAMETER DESIGNATION SCREEN

- ☑ E-mail TRANSMISSION DESTINATION ADDRESS — Emal_addr@adn.co.jp
- ☐ SMB TRANSMISSION DESTINATION ADDRESS — ¥¥asSZZZd¥kji¥oiu
- ☐ FTP TRANSMISSION DESTINATION ADDRESS — FTP://qwrr.fao.co.jp/pl/ok/
- ☐ webDAV TRANSMISSION DESTINATION ADDRESS — Http://qwrr.fao.co.jp/pl/ok/

(EXECUTE)

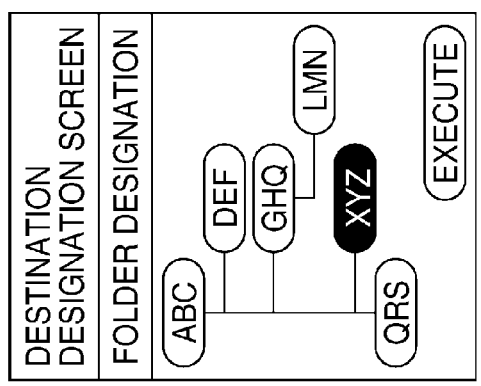

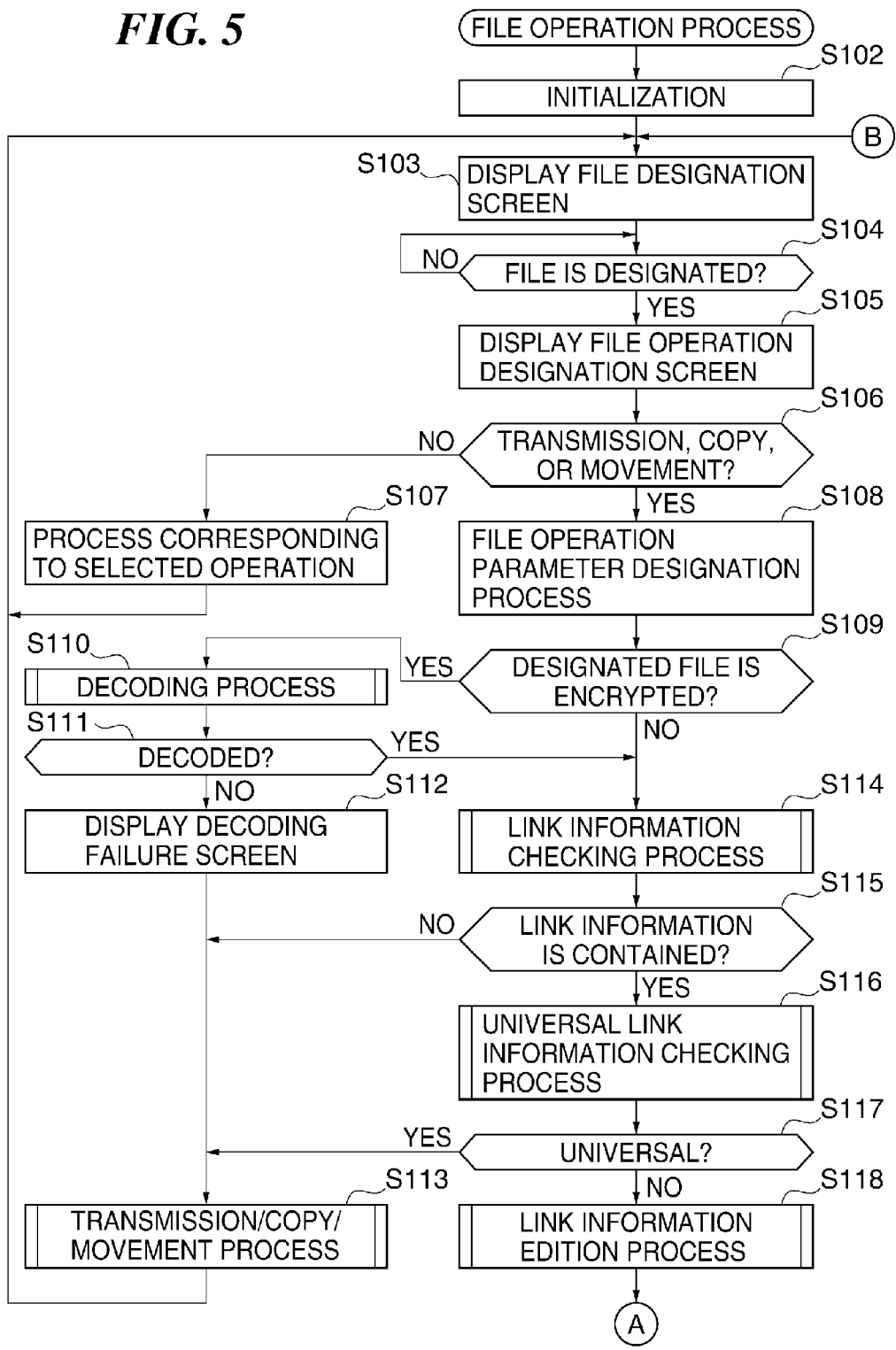

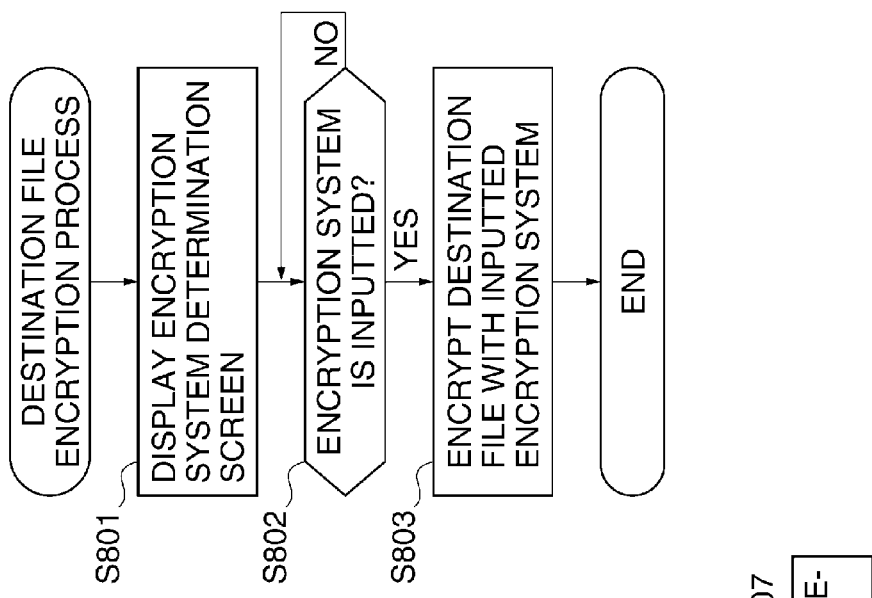
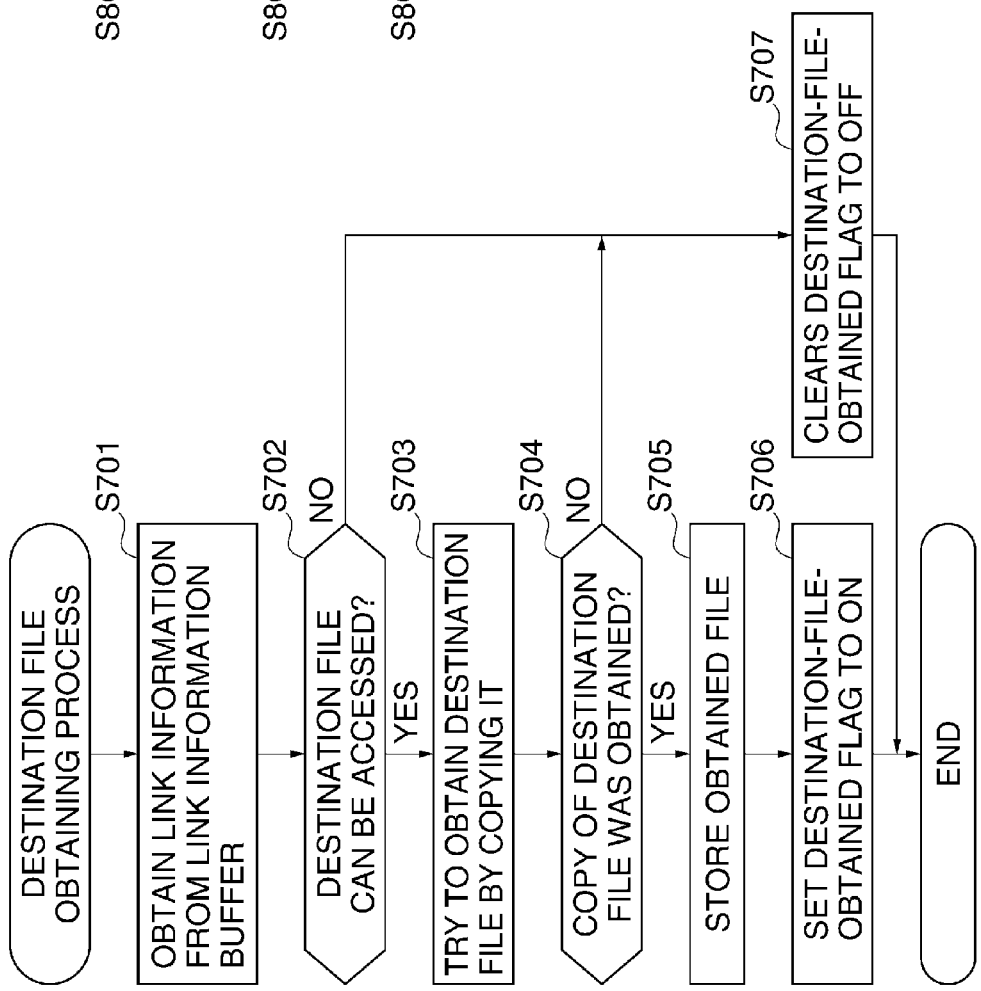

FIG. 13A

OPERATION SCREEN

- ☑ SCAN AND TRANSMISSION
- ☐ COPY
- ☐ SCAN AND FILE GENERATION (NEXT)

FIG. 13B

PARAMETER INPUT SCREEN

IMAGE SIZE
- ☐ A3  ☑ A4  ☐ A5  ☐ B4  ☐ B5

RESOLUTION
- ☐ 600dpi  ☑ 300dpi  ☐ 200dpi

COLOR/MONOCHROME
- ☑ COLOR  ☐ MONOCHROME

FILE FORMAT
- ☐ Jpg  ☑ Tiff  ☐ Bmp  ☐ PDF  ☐ Docx
- ☐ Pptx  ☐ Xlsx

ENCRYPTION
- ☑ ENCRYPT  ENCRYPTION KEY: ********

FILE NAME DESIGNATION
- ☐ FILE NAME AUTOMATIC GENERATION  FILE NAME INPUT: qwert.edc

ADDITION OF FILE LINK INFORMATION
- ☑ EMBED FILE LINK INFORMATION (NEXT)

FIG. 14A

LINK INFORMATION
DESIGNATION SCREEN

☑ DESIGNATION BY FILE

☐ INPUT CHARACTERS (NEXT)

FIG. 14B

FILE DESIGNATION SCREEN

FOLDER DESIGNATION

C:\
- ABC
  - DEF
  - GHQ
    - LMN
  - XYZ
- QRS 12345.pdf
2345.pdf
3456.pptx
4567.docx (NEXT)

FIG. 14C

FILE-ACCESS-PATH INPUT SCREEN

INPUT PATH TO FILE http://www.abc.canon.co.jp/store/ /version1/filename.xyz (NEXT)

INFORMATION PROCESSING APPARATUS ENABLING TRANSMISSION OF FILE CONTAINING LINK INFORMATION, CONTROL METHOD THEREFOR, AND STORAGE MEDIUM STORING CONTROL PROGRAM THEREFOR

BACKGROUND OF THE INVENTION

1. Field of the Invention

The present invention relates to an information processing apparatus that enables transmission of a file including link information, a control method therefor, and a storage medium storing a control program therefor.

2. Description of the Related Art

In recent years, a file (referred to as a "source file", hereafter) that contains link information to a destination file, which is different from the source file, and supports a mechanism by which the destination file is easily opened by clicking the contained link information is provided.

In such a mechanism, the relation between a source file and a destination file always has to hold a relationship shown by link information.

However, if the source file is transmitted, is copied, or is moved, the relation between the source file and the destination file may not hold the relationship shown by the link information.

In order to deal with such a case, Japanese Laid-Open Patent Publication (Kokai) No. 2010-176634 (JP 2010-176634A) discloses a solution in a case where a source file is a file (shortcut key) in which only link information to a destination file is described.

In the disclosed solution, when an operation to copy or move a shortcut key, which is a source file, to a designated location is requested, a destination file linked with the shortcut key is obtained, and the destination file is copied or moved to the designated location instead of copying or moving the shortcut key.

However, the technique disclosed in the above-mentioned publication is effective only when a source file is a file (shortcut key) in which only link information to a destination file is described.

Accordingly, the technique disclosed in the above-mentioned publication cannot be applied to a case where effective entity data and link information to a destination file are described in a source file.

Accordingly, there is a problem in that the destination file cannot be easily accessed from the link information of the source file after moving or copying.

SUMMARY OF THE INVENTION

The present invention provides an information processing apparatus, a control method therefor, and a storage medium storing a control program therefor, which are capable of accessing to a destination file even when a file including effective entity data and link information to the destination file is transmitted to an external apparatus.

Accordingly, a first aspect of the present invention provides an image pickup apparatus capable of transmitting a file containing link information to an external apparatus, comprising an obtaining unit configured to obtain a destination file when a designated file to be transmitted contains link information to the destination file that is different from the designated file, an edition unit configured to edit the link information contained in the designated file so as to become valid link information to the destination file even when the destination file obtained by the obtaining unit and the designated file will be transmitted to an external apparatus, and a transmission unit configured to transmit the designated file containing the link information edited by the edition unit and the destination file to the external apparatus.

Accordingly, a second aspect of the present invention provides a control method for an image pickup apparatus capable of transmitting a file containing link information to an external apparatus, comprising an obtaining step of obtaining a destination file when a designated file to be transmitted contains link information to the destination file that is different from the designated file, an edition step of editing the link information contained in the designated file so as to become valid link information to the destination file even when the destination file obtained in the obtaining step and the designated file will be transmitted to an external apparatus, and a transmission step of transmitting the designated file containing the link information edited in the edition step and the destination file to the external apparatus.

Accordingly, a third aspect of the present invention provides a non-transitory computer-readable storage medium storing a control program causing a computer to execute the control method of the second aspect.

According to the present invention, the information processing apparatus, the control method therefor, and the storage medium storing the control program therefor, which are capable of accessing to a destination file even when a file including effective entity data and link information to the destination file is transmitted to an external apparatus, can be provided.

Further features of the present invention will become apparent from the following description of exemplary embodiments with reference to the attached drawings.

BRIEF DESCRIPTION OF THE DRAWINGS

FIG. 2A through FIG. 2C are views showing various kinds of link information stored beforehand in a hard disk drive in FIG. 1.

FIG. 3A through FIG. 3C are views showing screen examples displayed on a display-input device in FIG. 1.

FIG. 4A through FIG. 4E are views showing screen examples displayed on the display-input device in FIG. 1.

FIG. 5 is a flowchart showing a part of procedures of a file operation process executed by a CPU shown in FIG. 1.

in FIG. 5.

FIG. 11A is a flowchart showing procedures of a destination file obtaining process executed in step S119 in FIG. 6.

FIG. 11B is a flowchart showing procedures of a destination file encryption process executed in step S125 in FIG. 6.

FIG. 13A and FIG. 13B are views showing screen examples displayed on a display-input device in FIG. 12.

FIG. 14A through FIG. 14C are views showing screen examples displayed on the display-input device in FIG. 12.

DESCRIPTION OF THE EMBODIMENTS

Hereafter, embodiments according to the present invention will be described in detail with reference to the drawings.

Figure 1:
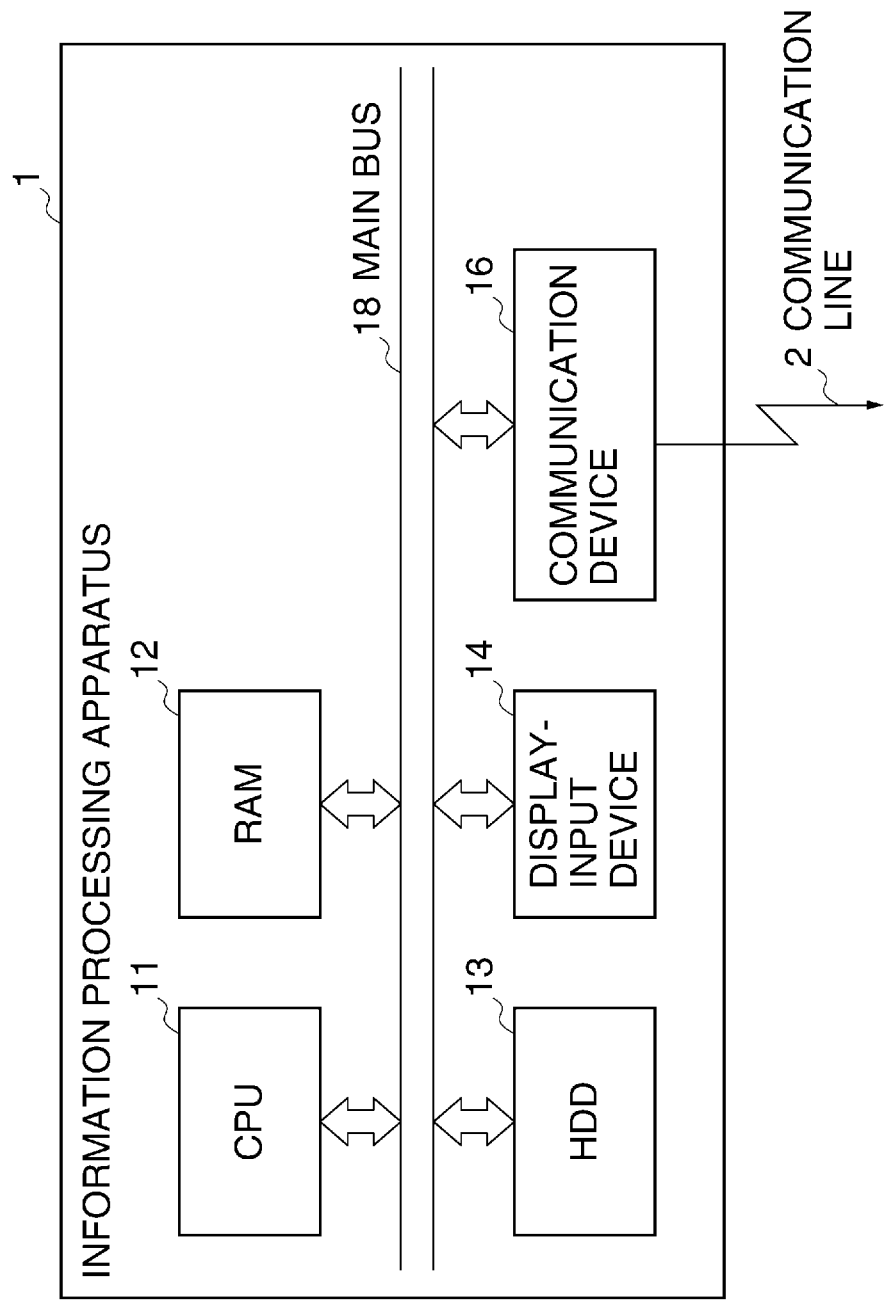
FIG. 1 is a view schematically showing a configuration of an information processing apparatus according to a first embodiment of the present invention.

FIG. 1 is a view schematically showing a configuration of an information processing apparatus 1 according to a first embodiment of the present invention.

As shown in FIG. 1, the information processing apparatus 1 consists of a CPU 11, a RAM 12, a hard disk drive (HDD) 13, a display-input device 14, and a communication device 16, which are connected via a main bus 18.

The CPU 11 controls the whole information processing apparatus 1. The RAM 12 is used as a work area of the CPU 11, and stores various data etc. The hard disk drive 13 is a nonvolatile storage unit that stores programs executed by the CPU 11, and data or the like. An SSD, a NVRAM, etc. may be used in place of the hard disk drive 13.

The display-input device 14 displays information for a user, and receives an input from a user. The communication device 16 communicates with an external apparatus using a communication line 2.

Next, various information used in a file operation process mentioned later, and screen examples displayed on the display-input device 14 will be described.

FIG. 2A through FIG. 2C are views showing various kinds of link information stored beforehand in the hard disk drive 13 drive in FIG. 1.

The link information shown in FIG. 2A is used when determining whether a certain file contains link information. Moreover, the link information shown in FIG. 2B is used when determining whether obtained link information is universal.

The link information shown in FIG. 2C is beforehand defined in order to generate new link information. New link information is generated by adding this link information ahead of the obtained link information. An example that adds the predetermined link information to the file name is shown in FIG. 2C.

FIG. 3A through FIG. 3C are views showing screen examples displayed on the display-input device 14 in FIG. 1.

FIG. 3A is a view showing a file designation screen on which a user designates a target file.

As shown in FIG. 3A, the file designation screen is configured so that a user can designate a folder and can designate a file in the folder. In the following description, a target file may be expressed as a designated file.

FIG. 3B is a view showing a file operation designation screen on which a user designates an operation content to a file. On the file operation designation screen, transmission, copy, movement, edition, deletion, and rename of a file can be selected as an operation content by a user.

FIG. 3C is a view showing a parameter designation screen about a file transmission. In the parameter designation screen, E-mail, SMB, FTP, or webDAV can be designated as a protocol used for transmitting a file, and an address can be inputted for each protocol.

The information processing apparatus 1 of the first embodiment can transmit the file designated by a user to an external apparatus through a transmission by a movement operation, a transmission by a copy operation, an E-mail transmission, an SMB transmission, an FTP transmission, or an webDAV transmission. However, the file transmission protocol is not limited to the above mentioned protocols, but the first embodiment can be applied to any protocol that enables transmission of a file to an external apparatus.

FIG. 4A is a view showing a destination designation screen displayed when an operation to a file is copy or movement. In the destination designation screen, a user can designate a folder of a movement destination.

FIG. 4B is a view showing an encryption key input screen. When decrypting an encrypted file, a user inputs an encryption key on the encryption key input screen.

FIG. 4C is a view showing a decoding failure screen displayed when decoding fails. FIG. 4D is a view showing a file obtaining error screen displayed when the file shown in link destination information cannot be obtained.

FIG. 4E is a view showing an encryption system determination screen on which a user designates a method when encrypting a destination file. The encryption method determination screen provides a user with three choices. The first choice is selected when the destination file is not encrypted. The second choice is selected when the destination file is encrypted with the same encryption system and password as the designated file. The third choice is selected when a user selects an encryption system and also inputs an encryption key.

Figure 6:
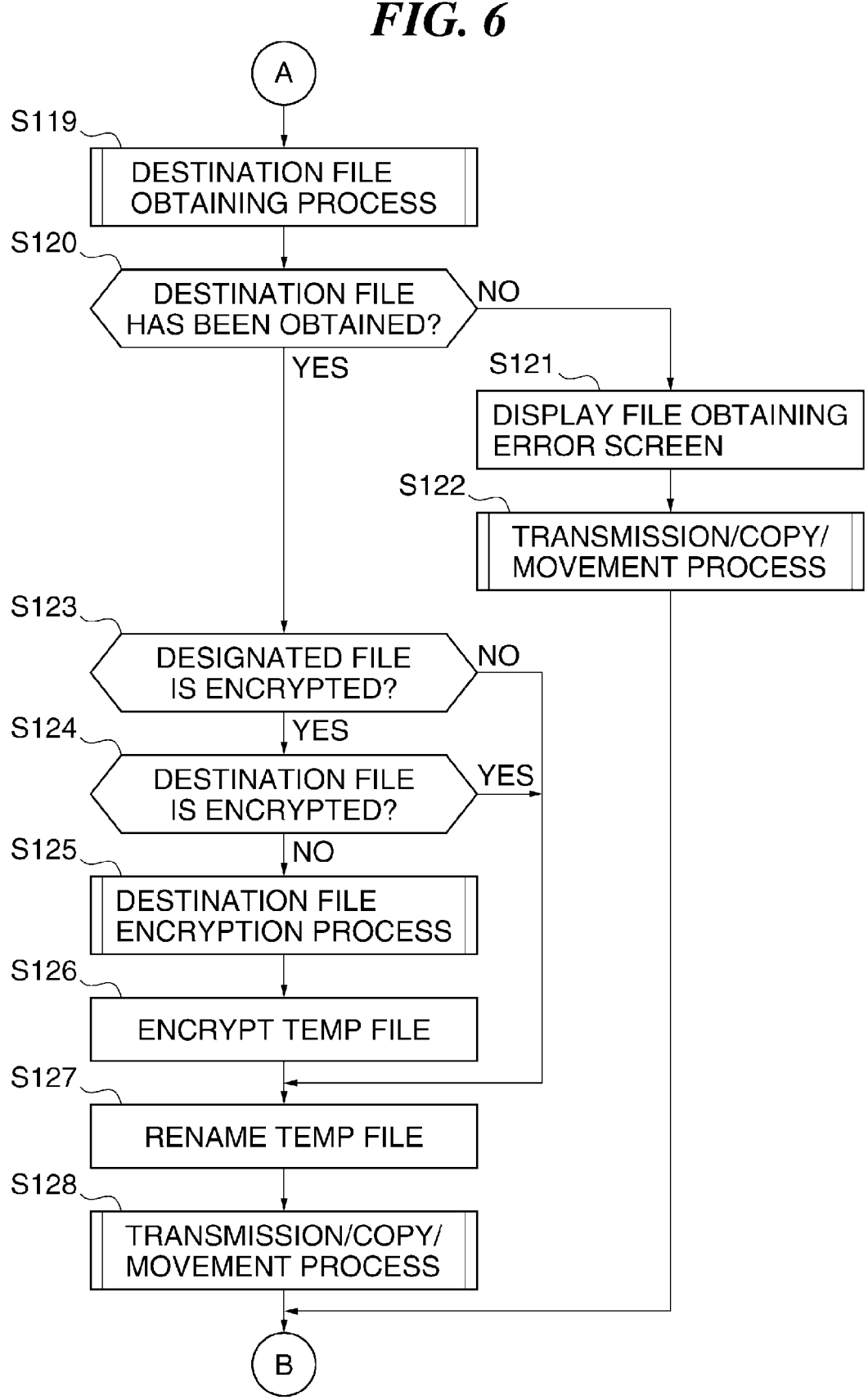
FIG. 6 is a flowchart showing the remaining part of the procedures of the file operation process executed by the CPU shown in FIG. 1.

FIG. 5 and FIG. 6 are flowcharts showing procedures of the file operation process executed by the CPU 11 shown in FIG. 1.

As shown in FIG. 5, when the information processing apparatus 1 starts, the CPU 11 initializes the system (step S102). Next, the CPU 11 displays the file designation screen shown in FIG. 3A (step S103). When a user designates the file (YES in the step S104), the CPU 11 displays the file operation designation screen shown in FIG. 3B (step S105).

The CPU 11 determines whether the operation designated by the user is transmission, copy, or movement (step S106). In the first embodiment, processes about transmission, copy, and movement are described, but the descriptions about processes corresponding to other operations are omitted.

As a result of the determination in the step S106, when the operation designated by the user is none of transmission, copy, and movement (NO in the step S106), the CPU 11 performs a process corresponding to the operation selected in step S107, and returns the process to step S103.

On the other hand, as a result of the determination in the step S106, when the operation designated by the user is transmission, copy, or movement (YES in the step S106), the CPU 11 performs a file operation parameter designation process (step S108).

Specifically, when the operation is transmission, the CPU 11 displays the parameter designation screen shown by FIG. 3C, and when the operation is copy or movement, the CPU 11 displays the destination designation screen shown in FIG. 4A. The information inputted through these screens is stored in a transmission parameter buffer of the RAM 12.

Next, the CPU 11 determines whether the designated file is encrypted with reference to the property of the designated file (step S109).

As a result of the determination in the step S109, when the designated file is encrypted (YES in the step S109), the CPU 11 performs a decoding process which decrypts a file (step S110). The decoding process sets a decoded flag to ON when the decoding succeeded. Moreover, when the decoding succeeded, the decoded designated file is stored in the hard disk drive 13 as a temp file. This decoding process will be mentioned later.

Next, the CPU 11 determines whether the decoding process succeeded with reference to the decoded flag (step S111). As a result of the determination in the step S111, when the decoding cannot be performed (NO in the step S111), the CPU 11 displays the decoding failure screen shown in FIG. 4C (step S112).

Then, the CPU 11 applies the transmission/copy/movement process to the file that does not contain link information (step S113), and returns the process to the step S103. The transmission/copy/movement process will be described below. Moreover, the transmission/copy/movement process corresponds to a transmission unit.

When the determination result in the step S109 is NO or when the determination result in the step S111 is YES, the CPU 11 performs a link information checking process for checking whether link information is contained in the designated file or the temp file (step S114). In the link information checking process, when link information is contained, a link information flag is set to ON and the link information is stored in a link information buffer. This link information checking process will be described later.

Next, the CPU 11 determines whether the link information is contained with reference to the link information flag (step S115).

As a result of the determination in the step S115, when the link information is not contained (NO in the step S115), the CPU 11 proceeds with the process to the above-mentioned step S113.

On the other hand, as a result of the determination in the step S115, when the link information is contained (YES in the step S115), the CPU 11 performs a universal link information checking process for checking whether the link information stored in the link information buffer is universal link information (step S116). When link information contained in a designated file is valid as link information to a destination file, which is different from the designated file, even after the designated file is transmitted to an external apparatus, such link information is referred to as universal link information.

In the universal link information checking process, a universal flag is set to ON when the link information is universal. This universal link information checking process will be described later.

Next, the CPU 11 determines whether the link information is contained with reference to the universal flag (step S117). As a result of the determination in the step S117, when the link information is universal (YES in the step S117), the CPU 11 determines that it is possible to access to the destination file designated by the link information even after the file operation, and proceeds with the process to the above-mentioned step S113.

On the other hand, as a result of the determination in the step S117, when the link information is not universal (NO in the step S117), the CPU 11 performs a link information editing process (step S118). This link information editing process will be described later. Moreover, this link information editing process corresponds to an edition unit.

As shown in FIG. 6, the CPU 11 performs a destination file obtaining process that obtains a destination file (step S119). In the destination file obtaining process, a destination-file-obtained flag is set to ON when the destination file has been obtained. This destination file obtaining process will be described later. Moreover, the step S119 corresponds to an obtaining unit that obtains the destination file when the designated file contains the link information to the destination file that is different from the designated file.

Next, the CPU 11 determines whether the destination file has been obtained with reference to the destination-file-obtained flag (step S120). As a result of the determination in the step S120, when the destination file has not been obtained (NO in the step S120), the CPU 11 displays the file obtaining error screen shown in FIG. 4D (step S121), performs the transmission/copy/movement process (step S122) that is the same as the process in the step S113 in FIG. 5, and returns the process to the step S103 in FIG. 5.

On the other hand, as a result of the determination in the step S120, when the destination file has been obtained (YES in the step S120), the CPU 11 determine whether the designated file is encrypted (step S123).

As a result of the determination in the step S123, when the file is not encrypted (NO in the step S123), the CPU 11 proceeds with the process to step S127.

On the other hand, as a result of the determination in the step S123, when the designated file is encrypted (YES in the step S123), the CPU 11 determines whether the destination file is encrypted (step S124).

As a result of the determination in the step S124, when the destination file is not encrypted (NO in the step S123), the CPU 11 proceeds with the process to step S127.

On the other hand, as a result of the determination in the step S124, when the destination file is not encrypted (NO in the step S124), the CPU 11 performs a destination file encryption process for encrypting the destination file (step S125). This destination file encryption process will be described later.

Next, the CPU 11 encrypts the temp file stored in the hard disk drive 13 with the same encryption system as used for the designated file (step S126), and renames the temp file to the same file name as the designated file (step S127).

Then, the CPU 11 applies the transmission/copy/movement process, which is the same as the process in the step S113 in FIG. 5, to the renamed file (step S128), and returns the process to the step S103 in FIG. 5. Thus, when the designated file is encrypted (YES in the step S123) and the destination file is not encrypted (NO in the step S124), the destination file encrypted in the step S125 is transmitted to the external apparatus.

Moreover, although the destination file obtaining process is performed after performing the link information editing process in the above-mentioned file operation process, the same result is obtained even if the destination file obtaining process is previously performed.

Figure 7:
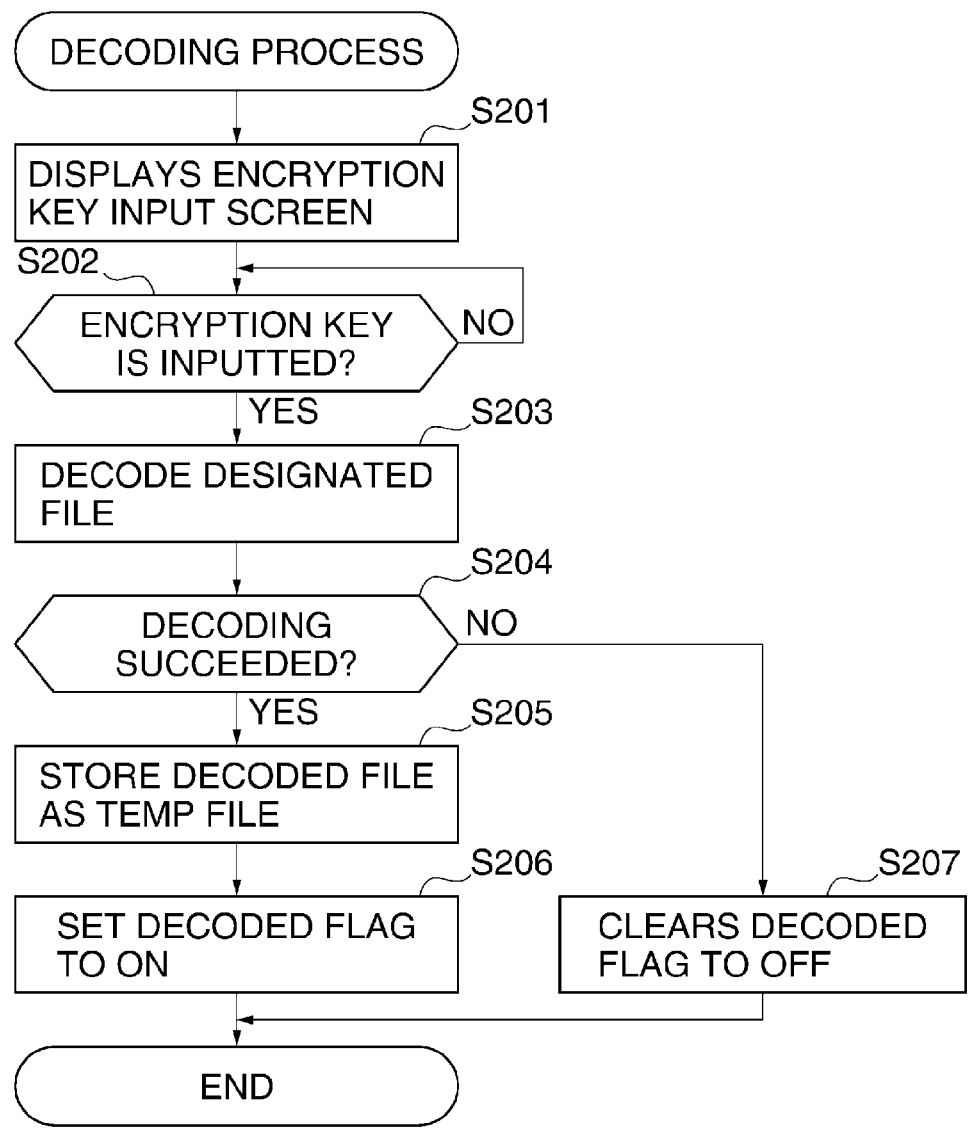
FIG. 7 is a flowchart showing procedures of a decoding process executed in step S110 in FIG. 5.

FIG. 7 is a flowchart showing procedures of the decoding process executed in the step S110 in FIG. 5.

As shown in FIG. 7, the CPU 11 displays the encryption key input screen shown in FIG. 4B in order to obtain an encryption key for decoding (step S201), and when an encryption key is inputted (YES in step S202), decodes the designated file (step S203).

Next, the CPU 11 determines whether the decoding succeeded (step S204). As a result of the determination in the step S204, when the decoding was failed (NO in the step S204), the CPU 11 clears the decoded flag to OFF (step S207), and finishes this process.

On the other hand, as a result of the determination in the step S204, when the decoding succeeded (YES in the step S204), the CPU 11 stores the decoded file as a temp file in the hard disk drive 13 (step S205), sets the decoded flag to ON (step S206), and finishes this process.

Figure 8:
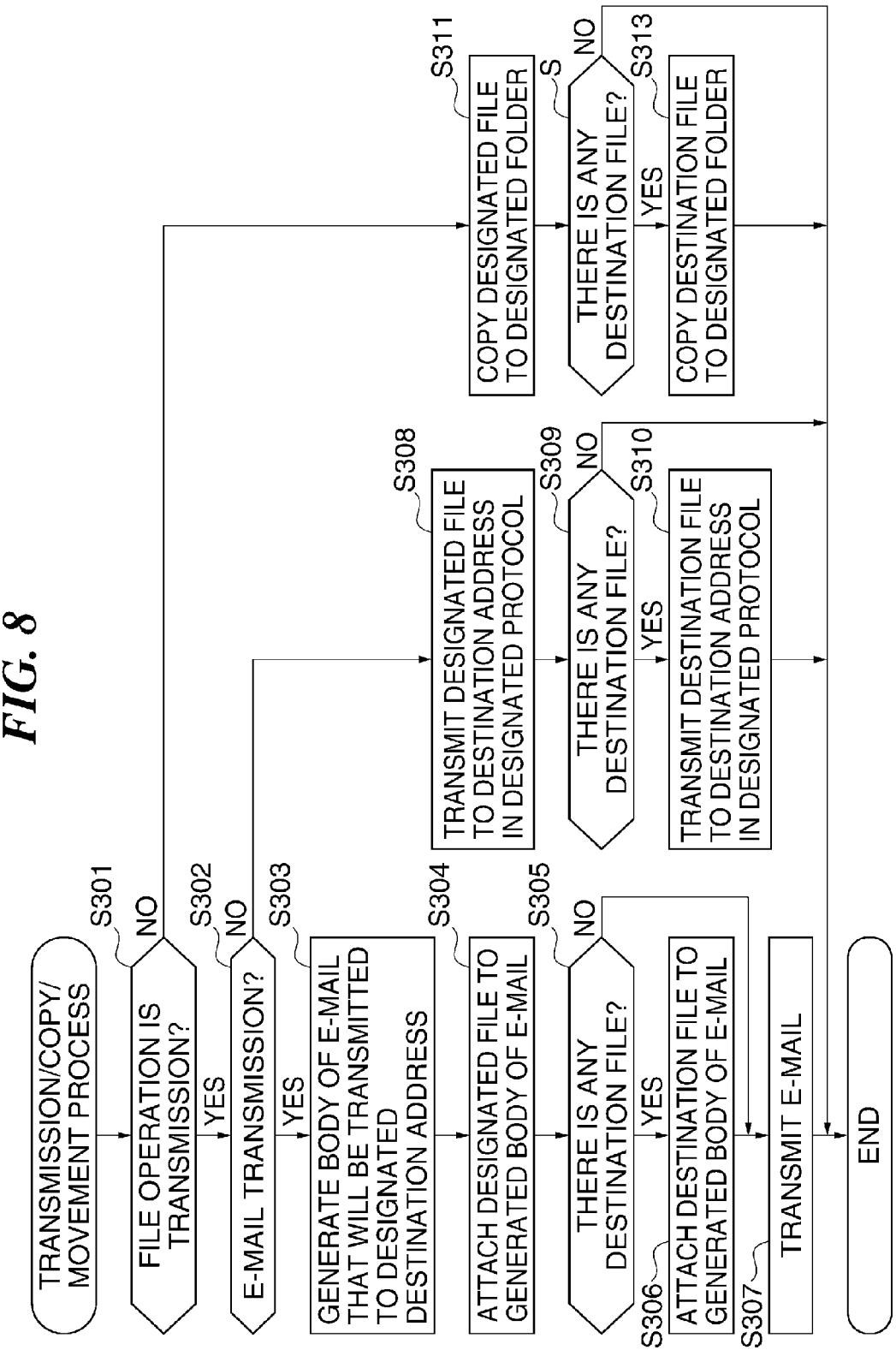
FIG. 8 is a flowchart showing procedures of a transmission/copy/movement process executed in step S113 etc.

FIG. 8 is a flowchart showing procedures of the transmission/copy/movement process executed in the step S113 in FIG. 5 etc.

As shown in FIG. 8, the CPU 11 determines whether the file operation is transmission with reference to the parameter stored in the transmission parameter buffer (step S301).

As a result of the determination in the step S301, when the file operation is transmission (YES in the step S301), the CPU 11 determines whether the file operation is E-mail transmission with reference to the transmission parameter buffer (step S302).

As a result of the determination in the step S302, when the file operation is E-mail transmission (YES in the step S302), the CPU 11 generates a body of an E-mail in which the transmission destination address stored in the transmission parameter buffer is set up (step S303).

Next, the CPU 11 attaches the designated file to the generated body of the E-mail (step S304), and determines whether there is any destination file (step S305).

As a result of the determination in the step S305, when there is no destination file (NO in the step S305), the CPU 11 makes the communication device 16 transmit the E-mail through the communication line 2 (step S307), and finishes this process.

On the other hand, as a result of the determination in the step S305, when there is a destination file (YES in the step S305), the CPU 11 attaches the destination file to the generated body of the E-mail (step S306), makes the communication device 16 transmit the E-mail through the communication line 2 (step S307), and finishes this process.

As a result of the determination in the step S302, when the file operation is not E-mail transmission (NO in the step S302), it is SMB/FTP/WebDAV transmission. Accordingly, the CPU 11 refers to the transmission parameter buffer, and makes the communication device 16 transmit the designated file to the destination address through the communication line 2 in the designated protocol (step S308).

Then, the CPU 11 determines whether there is a destination file (step S309). As a result of the determination in the step S309, when there is no destination file (NO in the step S309), the CPU 11 finishes this process.

On the other hand, as a result of the determination in the step S309, when there is a destination file (YES in the step S309), the CPU 11 refers to the transmission parameter buffer, makes the communication device 16 transmit the destination file to the destination address through the communication line 2 in the designated protocol (step S310), and finishes this process.

As a result of the determination in the step S301, when the file operation is not transmission (NO in the step S301), the file operation is copy or movement. Accordingly, the CPU 11 refers to the transmission parameter buffer, and copies the file to the designated folder (step S311).

Then, the CPU 11 determines whether there is a destination file (step S312). As a result of the determination in the step S312, when there is no destination file (NO in the step S312), the CPU 11 finishes this process.

On the other hand, as a result of the determination in the step S312, when there is a destination file (YES in the step S312), the CPU 11 refers to the transmission parameter buffer, copies the file to the designated folder (step S313), and finishes this process.

As mentioned above, the designated file that contains the link information edited and the destination file are transmitted to the external apparatus in the transmission/copy/movement process. Moreover, since the destination file is not obtained when the link information is universal, the determination results in the steps S305, S309, and S312 are NO. As a result, only the designated file will be transmitted to the external apparatus. Moreover, since the determination result in the step S117 in FIG. 5 is YES, the link information editing process is not performed, and therefore, the link information contained in the designated file is not edited.

Figure 9:
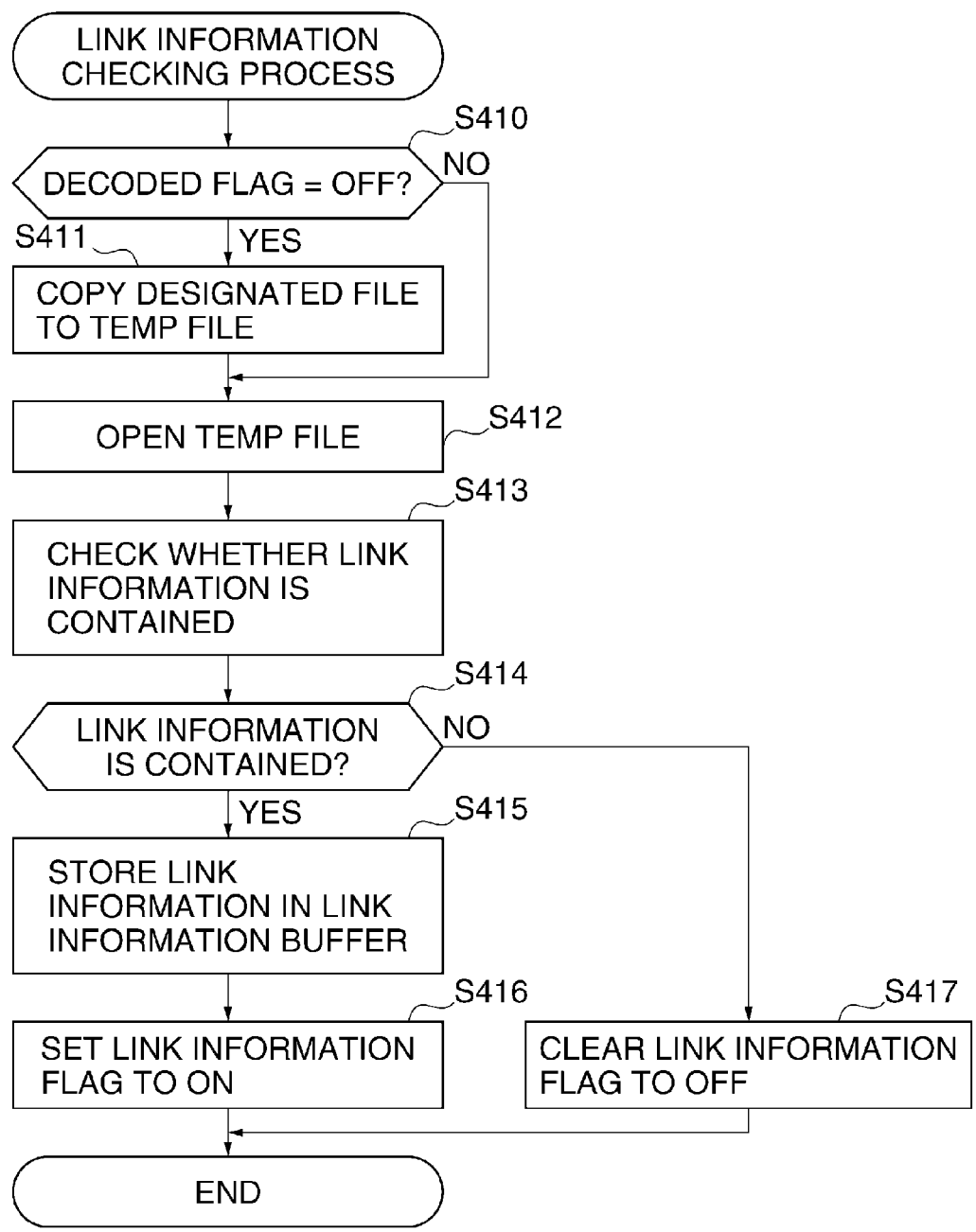
FIG. 9 is a flowchart showing procedures of a link information checking process executed in step S114 in FIG. 5.

FIG. 9 is a flowchart showing procedures of the link information checking process executed in the step S114 in FIG. 5.

As shown in FIG. 9, the CPU 11 determines whether the decoded flag is OFF (step S410). As a result of the determination in the step S410, when the decoded flag is ON (NO in the step S123), the CPU 11 proceeds with the process to step S412.

On the other hand, as a result of the determination in the step S410, when the decoded flag is OFF (YES in the step S410), the CPU 11 opens the designated file, copies it to a temp file, and stores the temp file in the hard disk drive 13 (step S411).

Next, the CPU 11 opens the temp file stored in the hard disk drive 13 (step S412), and checks whether the temp file contains link information (step S413). The CPU 11 searches the temp file for link information shown in FIG. 2A, and can determine that the link information is contained if there is a hit in the search.

Based on the result, the CPU 11 determines whether link information is contained (step S414). As a result of the determination in the step S414, when no link information is contained (NO in the step S414), the CPU 11 clears the decoded flag to OFF (step S417), and finishes this process.

On the other hand, as a result of the determination in the step S414, when the link information is contained (YES in the step S414), the CPU 11 stores the link information in the link information buffer of the RAM 12 (step S415), sets the link information flag to ON (step S416), and finishes this process.

Figure 10B:
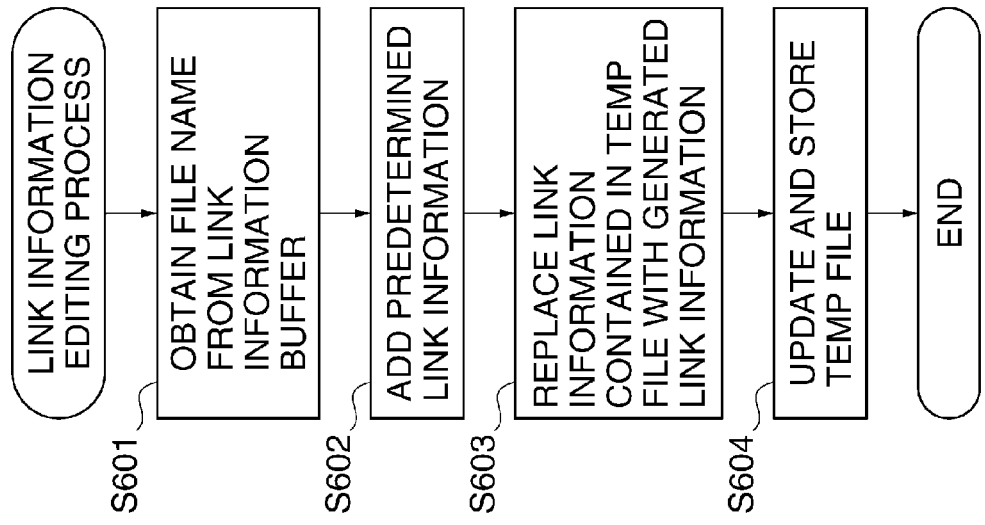
FIG. 10B is a flowchart showing procedures of a link information editing process executed in step S118 in FIG. 5.
Figure 10A:
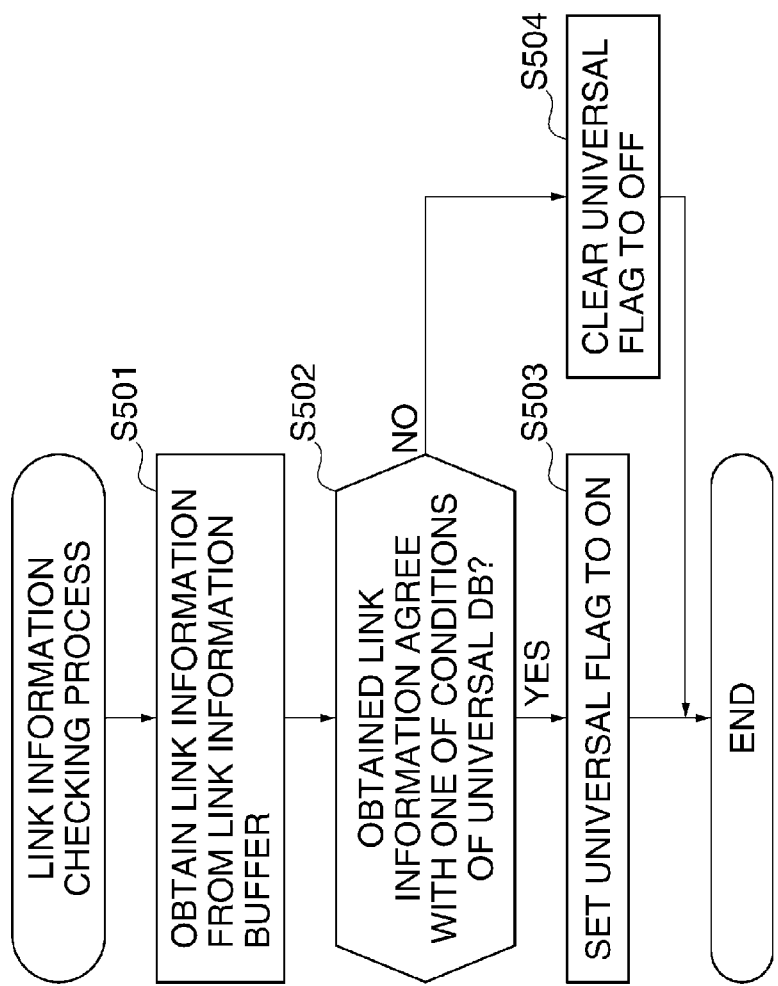
FIG. 10A is a flowchart showing procedures of a universal link information checking process executed in step S116 in FIG. 5.

FIG. 10A is a flowchart showing procedures of the universal link information checking process executed in the step S116 in FIG. 5.

As shown in FIG. 10A, the CPU 11 obtains link information from the link information buffer (step S501). The CPU 11 determines whether the obtained link information agrees with one of the conditions of the link information shown in FIG. 2B (step S502).

As a result of the determination in the step S502, when the link information agrees with one of the conditions (YES in the step S502), the CPU 11 determines that the link information is universal, sets the universal flag to ON (step S503), and finishes this process.

On the other hand, as a result of the determination in the step S502, when the link information does not agree with any conditions (NO in the step S502), the CPU 11 clears the decoded flag to OFF (step S504), and finishes this process.

FIG. 10B is a flowchart showing procedures of the link information editing process executed in the step S118 in FIG. 5.

As shown in FIG. 10B, the CPU 11 obtains a file name from the link information buffer (step S601), and adds the predetermined link information shown in FIG. 2C ahead of the file name to generate new link information (step S602).

Next, the CPU 11 replaces the link information contained in the temp file stored in the hard disk drive 13 with the new link information generated (step S603). The CPU 11 updates the temp file, stores it in the hard disk drive 13 (step S604), and finishes this process.

In this way, when the destination file and the designated file are transmitted to the external apparatus, the link information contained in the designated file is edited so as to become valid link information to the transmitted destination file by adding the predetermined link information, in the link information editing process, FIG. 11A is a flowchart showing procedures of the destination file obtaining process executed in the step S119 in FIG. 6.

As shown in FIG. 11A, the CPU 11 obtains the link information from the link information buffer of the RAM 12 (step S701).

Next, the CPU 11 determines whether the destination file designated by the obtained link information can be accessed (step S702). As a result of the determination in the step S702, when the destination file cannot be accessed (NO in the step S702), the CPU 11 clears the destination-file-obtained flag to OFF (step S707), and finishes this process.

On the other hand, as a result of the determination in the step S702, when the destination file can be accessed (YES in the step S720), the CPU 11 tries to obtain the destination file by copying it (step S703).

Next, the CPU 11 determines whether a copy of the destination file was obtained (step S704). As a result of the determination in the step S704, when the destination file was not obtained (NO in the step S704), the CPU 11 proceeds with the process to the above-mentioned step S707.

On the other hand, as a result of the determination in the step S704, when the destination file was obtained (YES in the step S704), the CPU 11 stores the obtained file in the hard disk drive 13 (step S705), sets the destination-file-obtained flag to ON (step S706), and finishes this process.

FIG. 11B is a flowchart showing procedures of the destination file encryption process executed in the step S125 in FIG. 6.

As shown in FIG. 11B, the CPU 11 displays the encryption system determination screen shown in FIG. 4E (step S801). Then, when the encryption system like a parameter required for encryption is inputted (YES in the step S802), the CPU 11 encrypts the destination file stored in the hard disk drive 13 with the inputted encryption system (step S803), and finishes this process.

Figure 12:
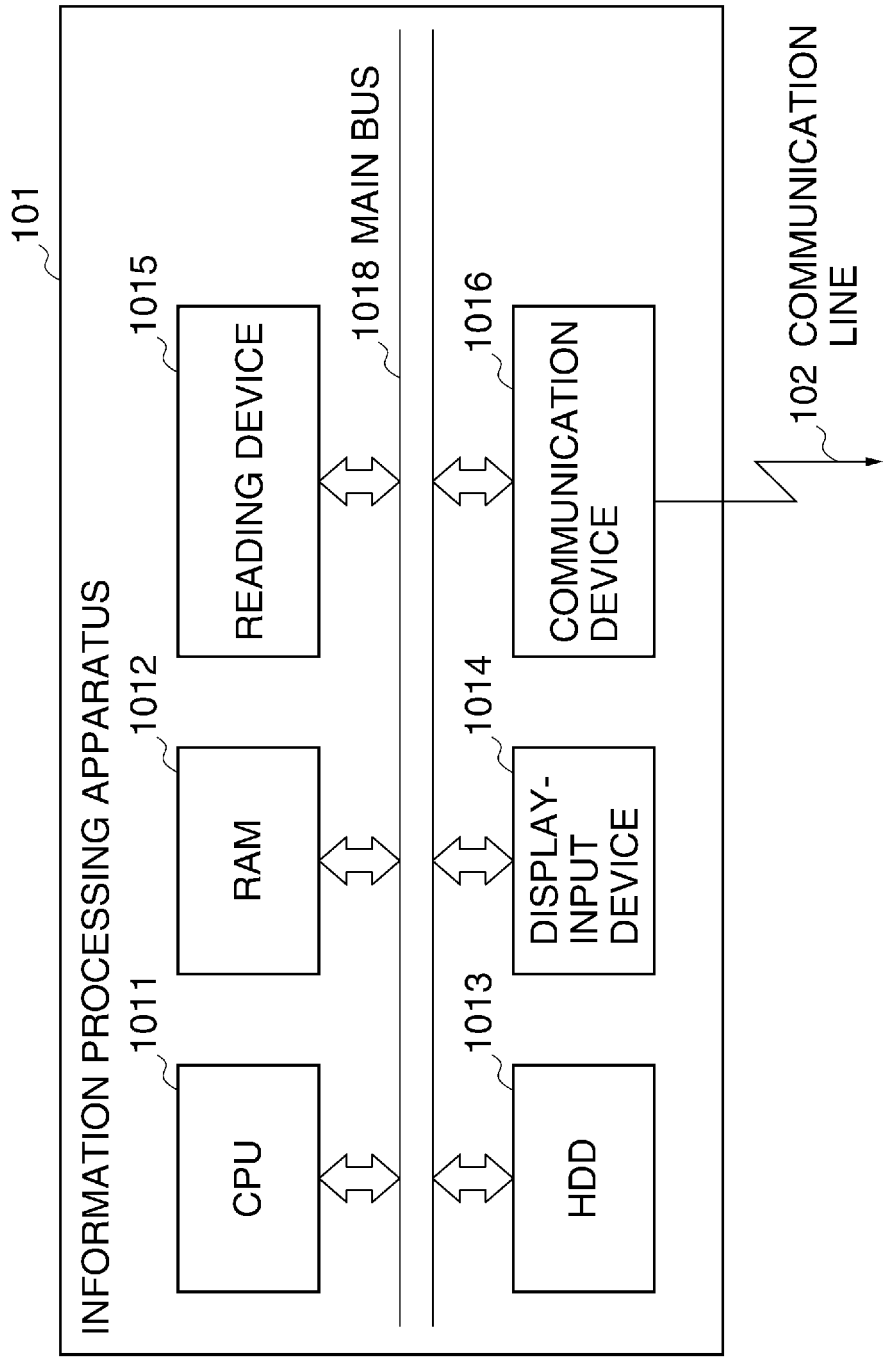
FIG. 12 is a view schematically showing a configuration of an information processing apparatus according to a second embodiment of the present invention.

FIG. 12 is a view schematically showing a configuration of an information processing apparatus 101 according to the second embodiment of the present invention.

As shown in FIG. 12, the information processing apparatus 101 consists of a CPU 1011, a RAM 1012, a reading device 1015, a hard disk drive (HDD) 1013, a display-input device 1014, and a communication device 1016, which are connected via a main bus 1018.

The CPU 1011 controls the whole information processing apparatus 101. The RAM 1012 is used as a work area of the CPU 1011, and stores various data etc. The hard disk drive 1013 is a nonvolatile storage unit that stores programs executed by the CPU 1011, and data or the like. An SSD, a NVRAM, etc. may be used in place of the hard disk drive 13.

A reading device 1015 optically reads a document and generates image data. The display-input device 1014 displays information for a user, and receives an input from a user. The communication device 1016 communicates with an external apparatus using a communication line 102. In the second embodiment, a designated file is image data that is generated by reading a document optically, and is a file that contains link information to another file (a destination file).

Next, various information used in a file operation process mentioned later, and screen examples displayed on the display-input device 1014 will be described.

FIG. 13A, FIG. 13B, FIG. 14A through FIG. 14C are views showing screen examples displayed on the display-input device 1014 in FIG. 12.

FIG. 13A is a view showing an operation screen on which a user designates an operation instruction. In the operation screen, a user can input an operation instruction from among "scan and transmission", "copy", and "scan and file generation".

FIG. 13B is a view showing a parameter input screen for inputting parameters about the scan. In the parameter input screen, an image size, resolution, color/monochrome, a file format, encryption, file name designation, and addition of file link information can be set.

FIG. 14A is a view showing a link information designation screen for designating link information. In the link information designation screen, a user can select either designation by selecting an existing file ("designation by file") or designation of a file path by inputting characters ("input characters").

FIG. 14B is a view showing a file designation screen used when the link information is designated by selecting an existing file. The file designation screen is configured so that a user can designate a folder and can designate a file in the folder.

FIG. 14C is a view showing a file-access-path input screen used when the link information is designated by inputting characters. In the file-access-path input screen, the link information can be designated by inputting the file path.

Figure 15:
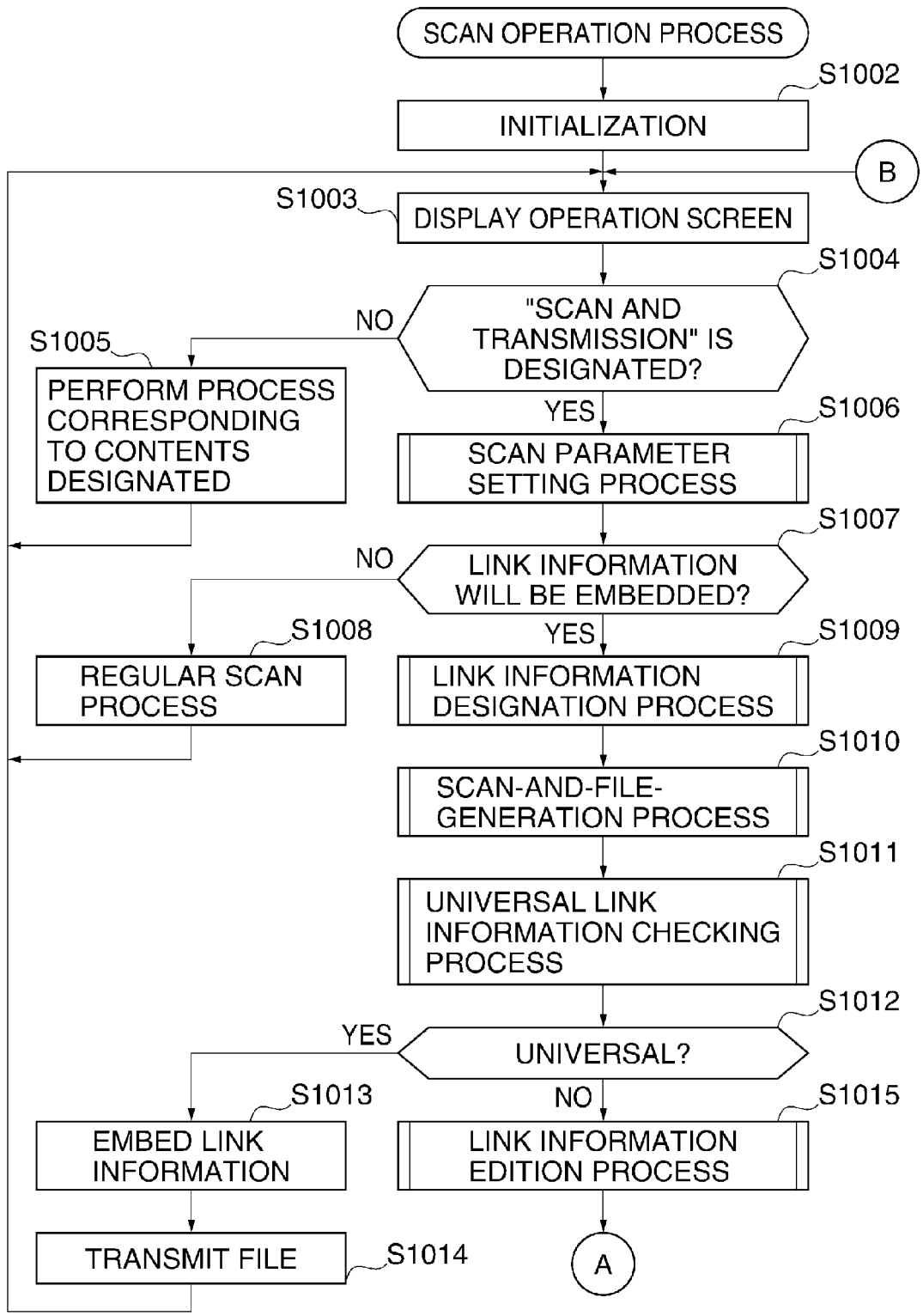
FIG. 15 is a flowchart showing a part of procedures of a scan operation process executed by a CPU shown in FIG. 12.
Figure 16:
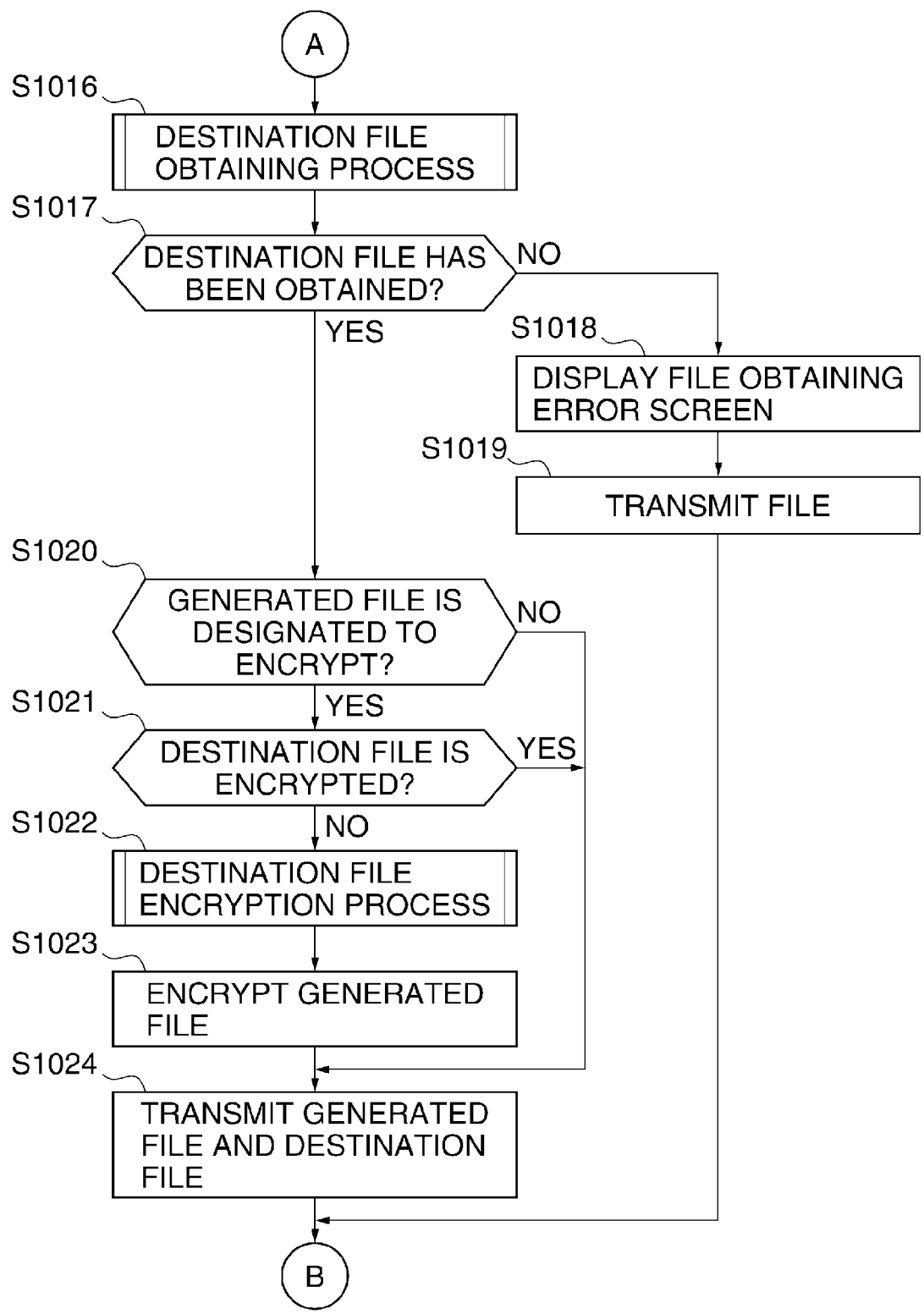
FIG. 16 is a flowchart showing the remaining part of the procedures of the scan operation process executed by the CPU shown in FIG. 12.

FIG. 15 and FIG. 16 are flowcharts showing procedures of the scan operation process executed by the CPU 1011 shown in FIG. 12.

As shown in FIG. 15, when the information processing apparatus 101 starts, the CPU 1011 initializes the system (step S1002). Next, the CPU 1011 displays the operation screen shown in FIG. 13A (step S1003), and determines whether the user designated the "scan and transmission" (step S1004).

In the second embodiment, the process of the "scan and transmission" will be described, and a description about a process corresponding to the other designation will be omitted.

As a result of the determination in the step S1004, when the "scan and transmission" is not designated (NO in the step S1004), the CPU 1011 performs a process corresponding to the contents designated in the step S1003 (step S1005), and return the process to the step S1003.

On the other hand, as a result of the determination in the step S1004, when the "scan and transmission" is designated (YES in the step S1004), the CPU 1011 performs a scan parameter setting process in which the user inputs the parameters about the scan (S1006). The scan parameter setting process in the step S1006 will be described later.

Next, the CPU 1011 determines whether the link information will be embedded with reference to the setting in the scan parameter setting process (step S1007). As a result of the determination in the step S1007, when the link information will not be embedded (NO in the step S1007), the CPU 1011 performs a regular scan process, and returns the process to the step S1003.

In the regular scan process, the CPU 1011 reads an original with the reading device 1015 with reference to the parameters set in the scan parameter setting process, generates an image file, and makes the communication device 1016 transmit the generated image file through the communication line 102.

On the other hand, as a result of the determination in the step S1007, the link information will be embedded (YES in the step S1007), the CPU 1011 performs a link information designation process in which the user designates the link information (step S1009). The link information designation process in the step S1009 will be described later.

Next, the CPU 1011 performs a scan-and-file-generation process for scanning an original and generating a file that shows the original (step S1010). The scan-and-file-generation process in the step S1010 will be described later.

Furthermore, the CPU 1011 performs the link information checking process described in FIG. 10A (step S1011). Then, the CPU 1011 determines whether the link information is universal with reference to the universal flag (step S1012). As a result of the determination in the step S1012, when the link information is universal (YES in the step S1012), the CPU 1011 embeds the link information stored in the link information buffer into the file (step S1013). Then, the CPU 1011 transmits the file according to the parameters stored in the transmission parameter buffer (step S1014), and returns the process to the step S1003.

On the other hand, as a result of the determination in the step S1012, when the link information is not universal (NO in the step S1012), the CPU 1011 performs the link information editing process shown in FIG. 10B (step S118).

As shown in FIG. 16, the CPU 1011 perform the destination file obtaining process shown in FIG. 11A for obtaining a destination file (step S1016).

Then, the CPU 1011 determines whether the destination file has been obtained with reference to the destination file obtained flag (step S1017). As a result of the determination in the step S1017, when the destination file has not been obtained (NO in the step S1017), the CPU 1011 displays the file obtaining error screen shown in FIG. 4D (step S1018), transmits the file (step S1019) as with the step S1014 in FIG. 15, and returns the process to the step S1003 in FIG. 15.

On the other hand, as a result of the determination in the step S1017, when the destination file has been obtained (YES in the step S1017), the CPU 11 determine whether the generated file is designated to be encrypted (step S1020).

As a result of the determination in the step S1020, when the generated file is not designated to be encrypted (NO in the step S1020), the CPU 11 proceeds with the process to step S1024.

On the other hand, as a result of the determination in the step S1020, when the generated file is designated to be encrypted (YES in the step S1020), the CPU 11 determines whether the destination file is encrypted (step S1021).

As a result of the determination in the step S1021, when the destination file is encrypted (YES in the step S1021), the CPU 1011 proceeds with the process to step S1024.

On the other hand, as a result of the determination in the step S1021, when the destination file is not encrypted (NO in the step S1021), the CPU 1011 performs the destination file encryption process shown in FIG. 11B (step S1022).

Next, the CPU 1011 encrypts the generated file that is stored in the hard disk drive 13 (step S1023), transmits the file that is generated and encrypted and the destination file (step S1024), and returns the process to the step S1003 in FIG. 15.

Figure 17A:
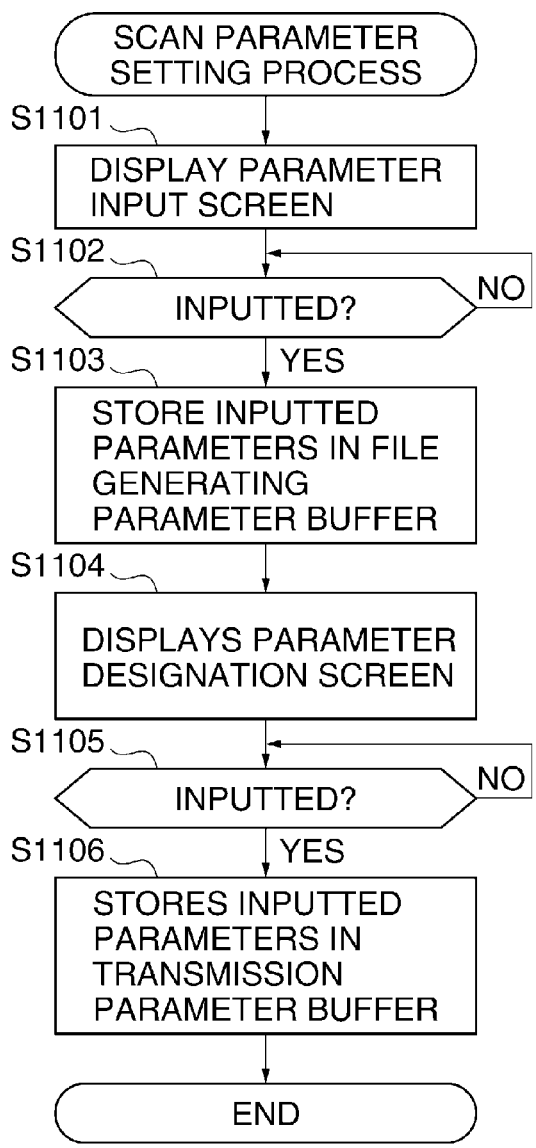
FIG. 17A is a flowchart showing procedures of a scan parameter setting process executed in step S1006 in FIG. 15.

FIG. 17A is a flowchart showing procedures of the scan parameter setting process executed in the step S1006 in FIG. 15.

As shown in FIG. 17A, the CPU 11 displays the parameter input screen shown in FIG. 13B (step S1101). When the user inputs the parameters (YES in the step S1102), the CPU 1011 stores the inputted parameters in the file generating parameter buffer of the RAM 1002 (step S1103).

Next, the CPU 1011 displays the parameter designation screen shown in FIG. 3C (step S1104). When the user inputs the parameters (YES in the step S1105), the CPU 1011 stores the inputted parameters in the transmission parameter buffer of the RAM 1002 (step S1106), and finishes this process.

Figure 17B:
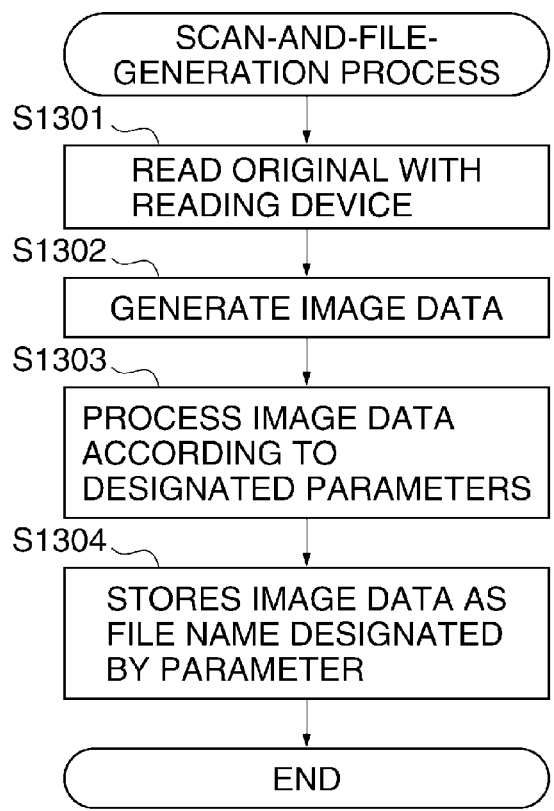
FIG. 17B is a flowchart showing procedures of a scan-and-file-generation process executed in step S1011 in FIG. 15.

FIG. 17B is a flowchart showing procedures of the scan-and-file-generation process executed in the step S1011 in FIG. 15.

As shown in FIG. 17B, the CPU 1011 makes the reading device 1015 read an original optically according to the parameters stored in the file generating parameter buffer (step S1301), and generates image data (step S1302).

Next, the CPU 1011 processes the generated image data according to the parameters stored in the file generating parameter buffer (S1303). Then, the CPU 1011 stores the processed image data in the hard disk drive 1013 as a file name designated by the parameter stored in the file generating parameter buffer (step S1304), and finishes this process.

Figure 18:
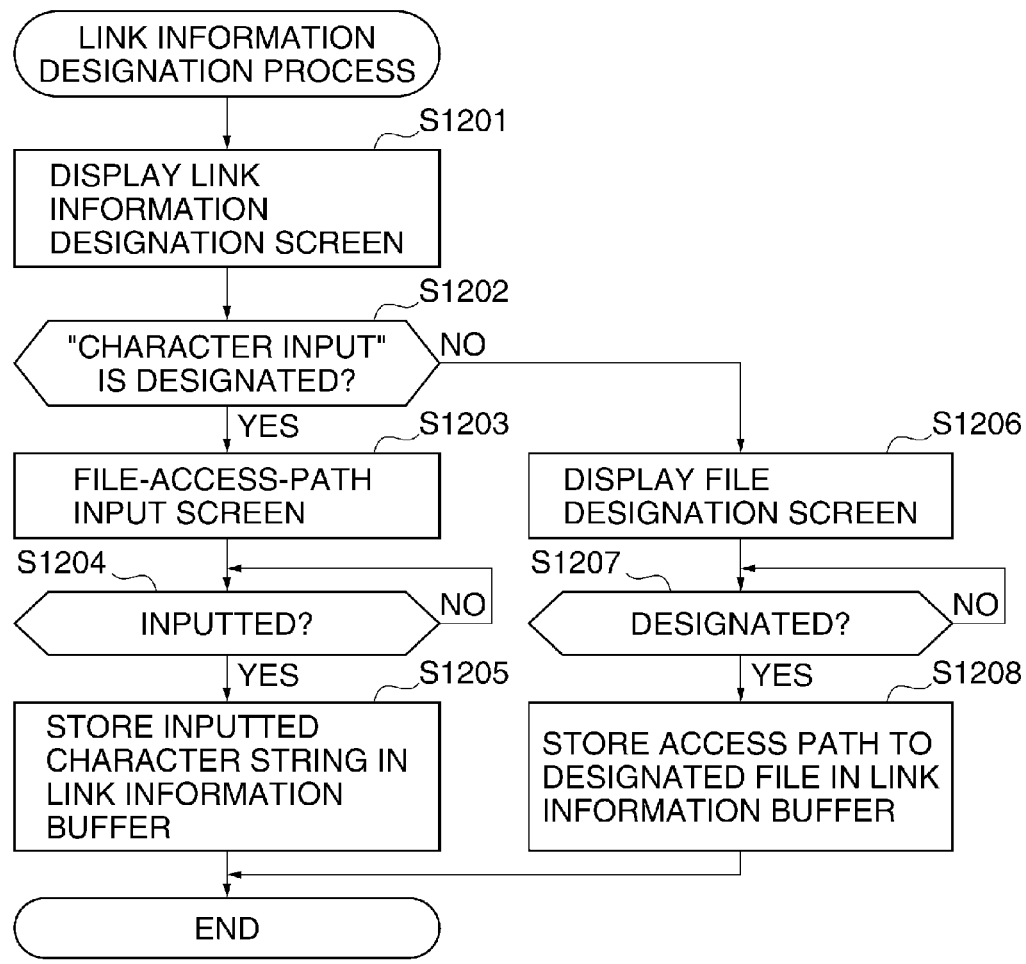
FIG. 18 is a flowchart showing procedures of a link information designation process executed in step S1008 in FIG. 15.

FIG. 18 is a flowchart showing procedures of the link information designation process executed in the step S1009 in FIG. 15.

As shown in FIG. 18, the CPU 1011 displays the link information designation screen shown in FIG. 14A (step S1201), and determines whether the user designates the "character input" on the link information designation screen (step S1202).

As a result of the determination in the step S1202, when the "character input" is designated (YES in the step S1202), the CPU 1011 displays the file-access-path input screen shown in FIG. 14C (step S1203).

When the file access path is inputted (YES in the step S1204), the CPU 1011 stores the inputted character string in the link information buffer of the RAM 1002 (step S1205), and finishes this process.

On the other hand, as a result of the determination in the step S1202, when the user designates the "designation of file", not the "input characters" (NO in the step S1202), the CPU 1011 displays the file designation screen shown in FIG. 14B (step S1206).

When the file is designated (YES in the step S1207), the CPU 1011 stores the access path to the designated file in the link information buffer of the RAM 1002 (step S1208), and finishes this process.

In this way, the relation between the source file and the destination file can be kept even after the source file is transmitted. Since the link information is edited, the destination file after transmission can be accessed based on the link information of the source file after transmission.

According to the second embodiment, when a designated file contains the link information to a destination file, the destination file is obtained (the step S119), the link information contained in the designated file is edited so as to be link information to the transmitted destination file when the obtained destination file and the designated file will be transmitted to an external apparatus (the step S118), and the designated file of which the contained link information was edited and the destination file are transmitted to the external apparatus (the step S128). Accordingly, it is possible to access to the destination file even if the designated file that contains the link information to the destination file is transmitted to the external apparatus.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-171246, filed Aug. 21, 2013, which is hereby incorporated by reference herein in its entirety.

What is claimed is:

1. An image pickup apparatus capable of transmitting a file containing entity data and link information to an external apparatus, comprising:
   an obtaining unit configured to obtain a destination file when a designated file to be transmitted contains, in addition to the entity data, link information to the destination file that is different from the designated file;
   an edition unit configured to edit the link information contained in the designated file so as to become valid link information to the destination file even when the destination file obtained by said obtaining unit and the designated file will be transmitted to an external apparatus; and
   a transmission unit configured to transmit the designated file containing the entity data and the link information edited by said edition unit, as well as the destination file to the external apparatus, at one time,
   wherein at least one of the obtaining unit, the edition unit, and the transmission unit is implemented by a processor and a memory.

2. The information processing apparatus according to claim 1, wherein said transmission unit transmits the destination file encrypted to the external apparatus when the designated file is encrypted and the destination file is not encrypted.

3. The information processing apparatus according to claim 1, wherein the designated file is image data generated by reading a document optically, and contains the link information to the destination file.

4. The information processing apparatus according to claim 1, wherein said transmission unit transmits the designated file through one of a transmission by a movement operation, a transmission by a copy operation, an E-mail transmission, an SMB transmission, an FTP transmission, and an webDAV transmission.

5. The information processing apparatus according to claim 1, wherein said obtaining unit does not obtain the destination file, said edition unit does not edit the link information, and said transmission unit transmits the designation file only, when the link information contained in the designated file is valid as the link information to the destination file even after the designated file is transmitted to the external apparatus.

6. A control method for an image pickup apparatus capable of transmitting a file containing entity data and link information to an external apparatus, comprising:
   an obtaining step of obtaining a destination file when a designated file to be transmitted contains, in addition to the entity data, link information to the destination file that is different from the designated file;
   an edition step of editing the link information contained in the designated file so as to become valid link information to the destination file even when the destination file obtained in said obtaining step and the designated file will be transmitted to an external apparatus; and
   a transmission step of transmitting the designated file containing the entity data and the link information edited in said edition step, as well as the destination file to the external apparatus, at one time.

7. The control method for the information processing apparatus according to claim 6, wherein the destination file encrypted is transmitted to the external apparatus in said transmitting step when the designated file is encrypted and the destination file is not encrypted.

8. The control method for the information processing apparatus according to claim 6, wherein the designated file is image data generated by reading a document optically, and contains the link information to the destination file.

9. The control method for the information processing apparatus according to claim 6, wherein the designated file is transmitted through one of a transmission by a movement operation, a transmission by a copy operation, an E-mail transmission, an SMB transmission, an FTP transmission, and an webDAV transmission, in said transmission step.

10. The control method for the information processing apparatus according to claim 6, wherein the destination file is not obtained in said obtaining step, the link information is not edited in said edition step, and only the designation file is transmitted in said transmission step, when the link information contained in the designated file is valid as the link information to the destination file even after the designated file is transmitted to the external apparatus.

11. A non-transitory computer-readable storage medium storing a control program causing a computer to execute a control method for an information processing apparatus capable of transmitting a file containing link information to an external apparatus, the control method comprising:
   an obtaining step of obtaining a destination file when a designated file to be transmitted contains, in addition to the entity data, link information to the destination file that is different from the designated file;
   an edition step of editing the link information contained in the designated file so as to become valid link information to the destination file even when the destination file obtained in said obtaining step and the designated file will be transmitted to an external apparatus; and
   a transmission step of transmitting the designated file containing the entity data and the link information edited in said edition step, as well as the destination file to the external apparatus, at one time.

12. The non-transitory computer-readable storage medium according to claim 11, wherein the destination file encrypted is transmitted to the external apparatus in said transmitting step when the designated file is encrypted and the destination file is not encrypted.

13. The non-transitory computer-readable storage medium according to claim 11, wherein the designated file is image data generated by reading a document optically, and contains the link information to the destination file.

14. The non-transitory computer-readable storage medium according to claim 11, wherein the designated file is transmitted through one of a transmission by a movement operation, a transmission by a copy operation, an E-mail transmission, an SMB transmission, an FTP transmission, and an webDAV transmission, in said transmission step.

15. The non-transitory computer-readable storage medium according to claim 11, wherein the destination file is not obtained in said obtaining step, the link information is not edited in said edition step, and only the designation file is transmitted in said transmission step, when the link information contained in the designated file is valid as the link information to the destination file even after the designated file is transmitted to the external apparatus.

\* \* \* \* \*